US012682904B2

(12) United States Patent (10) Patent No.: US 12,682,904 B2
Chen et al. (45) Date of Patent: Jul. 14, 2026

(54) METHOD FOR DETERMINING RESPONSE DEVICE, DEVICE, AND SERVER

(71) Applicants: FOSHAN SHUNDE MIDEA ELECTRIC SCIENCE AND TECHNOLOGY CO., LTD., Foshan (CN); GD MIDEA AIR-CONDITIONING EQUIPMENT CO., LTD., Foshan (CN)

(72) Inventors: Baiyang Chen, Foshan (CN); Yirong Chen, Foshan (CN); Weiming Huo, Foshan (CN); Hongyan Xi, Foshan (CN); Congcong Xu, Foshan (CN)

(73) Assignees: FOSHAN SHUNDE MIDEA ELECTRIC SCIENCE AND TECHNOLOGY CO., LTD., Foshan (CN); GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 147 days.

(21) Appl. No.: 18/589,884

(22) Filed: Feb. 28, 2024

(65) Prior Publication Data

US 2024/0203422 A1 Jun. 20, 2024

Related U.S. Application Data

(63) Continuation of application No. PCT/CN2022/082565, filed on Mar. 23, 2022.

(30) Foreign Application Priority Data

Aug. 30, 2021 (CN) .......................... 202111007071.0

(51) Int. Cl.
 *G10L 15/22* (2006.01)
 *G10L 15/30* (2013.01)

(52) U.S. Cl.
 CPC .............. *G10L 15/30* (2013.01); *G10L 15/22* (2013.01)

(58) Field of Classification Search
 CPC ......... G10L 15/30; G10L 15/22; G10L 25/51; H04L 12/12
 See application file for complete search history.

(56) References Cited

U.S. PATENT DOCUMENTS 9,812,126 B2 * 11/2017 Khan ........................ G06F 3/14
10,616,726 B1 4/2020 Freeman, II et al.
(Continued)

FOREIGN PATENT DOCUMENTS

CN 107797533 A 3/2018
CN 108847219 A 11/2018
(Continued)

OTHER PUBLICATIONS

Notice of Reasons for Refusal dated Mar. 19, 2025 received in Japanese Patent Application No. 2024-513487.
(Continued)

*Primary Examiner* — Abul K Azad
(74) *Attorney, Agent, or Firm* — Scully, Scott, Murphy & Presser, P.C.

(57) ABSTRACT

A method for determining a response device, a device, and a server are provided. The method includes: obtaining a target probability value of a device as a response device based on a preset probability value strategy subsequent to receiving a voice control signal, the probability value strategy being determined based on response state information of the device to the voice control signal; determining a target signal-to-noise ratio based on the target probability value and a signal-to-noise ratio of the received voice control (Continued)

Obtaining a target probability value of a device as a response device based on a predetermined probability value strategy if a voice control signal is received, the probability value strategy being determined based on response state information of the device to the voice control signal — 101

Determining a target signal-to-noise ratio based on the target probability value and a signal-to-noise ratio of the received voice control signal — 102

Determining whether the device is a response device to the voice control signal based on the target signal-to-noise ratio — 103 signal; and determining whether the device is a response device to the voice control signal based on the target signal-to-noise ratio.

16 Claims, 5 Drawing Sheets

(56)                References Cited

U.S. PATENT DOCUMENTS

| 10,909,983 | B1 | 2/2021 | Peng et al. | |
| 12,211,500 | B2 * | 1/2025 | Lee | G10L 15/20 |
| 2018/0061394 | A1 * | 3/2018 | Kim | G10L 15/02 |
| 2020/0074988 | A1 * | 3/2020 | Park | G06N 3/08 |
| 2021/0249018 | A1 | 8/2021 | Shin et al. | |

FOREIGN PATENT DOCUMENTS

| CN | 109410943 | A | 3/2019 |
| CN | 110459221 | A | 11/2019 |
| CN | 111063343 | A | 4/2020 |
| CN | 111223497 | A | 6/2020 |
| CN | 111968644 | A | 11/2020 |
| CN | 112 037 789 | A | 12/2020 |
| CN | 112562666 | A | 3/2021 |
| CN | 113096658 | A | 7/2021 |
| EP | 3 224 833 | B1 | 6/2019 |
| JP | 2020016890 | A | 1/2020 |
| WO | 2021/000876 | A1 | 1/2001 |

OTHER PUBLICATIONS

First Office Action dated Jun. 14, 2025 received in Chinese Patent Application No. 202111007071.0.

International Search Report and Written Opinion dated May 27, 2022 received in International Application No. PCT/CN2022/082565.

Extended European Search Report dated Oct. 9, 2024 received in European Patent Application No. EP 22862600.8.

Third Office Action dated Oct. 31, 2025 received in Chinese Patent Application No. 202111007071.0.

Second Office Action dated Sep. 20, 2025 received in Chinese Patent Application No. 202111007071.0.

Decision to Grant dated Aug. 19, 2025 received in Japanese Patent Application No. 2024-513487.

Office Action dated Mar. 31, 2026 received in Chinese Patent Application No. 202111007071.0.

Yang, Y., "Research on Multy-Channel Interaction of Handheld Mobile Device Based on Voice Interaction", Beijing University of Posts and Telecommunications, Dec. 30, 2017; pp. 1-76.

* cited by examiner

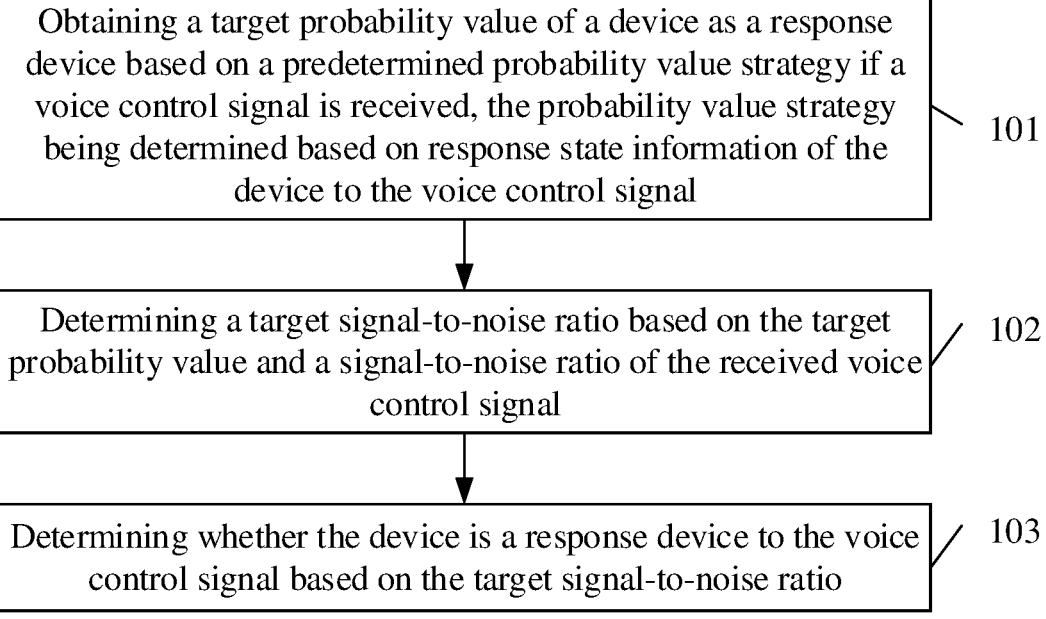

Obtaining a target probability value of a device as a response device based on a predetermined probability value strategy if a voice control signal is received, the probability value strategy being determined based on response state information of the device to the voice control signal        101

Determining a target signal-to-noise ratio based on the target probability value and a signal-to-noise ratio of the received voice control signal        102

Determining whether the device is a response device to the voice control signal based on the target signal-to-noise ratio        103

FIG. 1

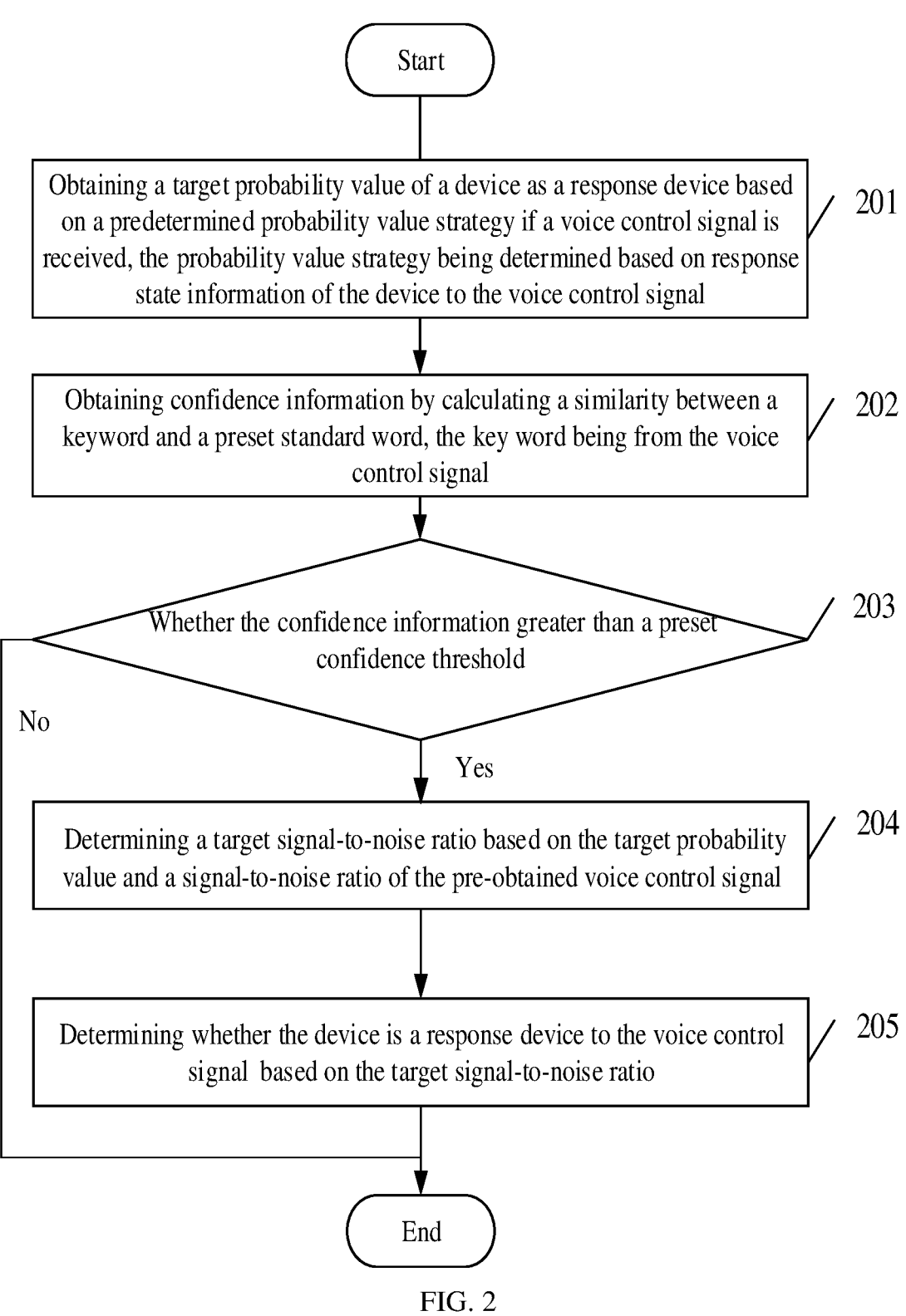

Start

Obtaining a target probability value of a device as a response device based on a predetermined probability value strategy if a voice control signal is received, the probability value strategy being determined based on response state information of the device to the voice control signal — 201

Obtaining confidence information by calculating a similarity between a keyword and a preset standard word, the key word being from the voice control signal — 202

Whether the confidence information greater than a preset confidence threshold — 203

No

Yes

Determining a target signal-to-noise ratio based on the target probability value and a signal-to-noise ratio of the pre-obtained voice control signal — 204

Determining whether the device is a response device to the voice control signal based on the target signal-to-noise ratio — 205

End

FIG. 2

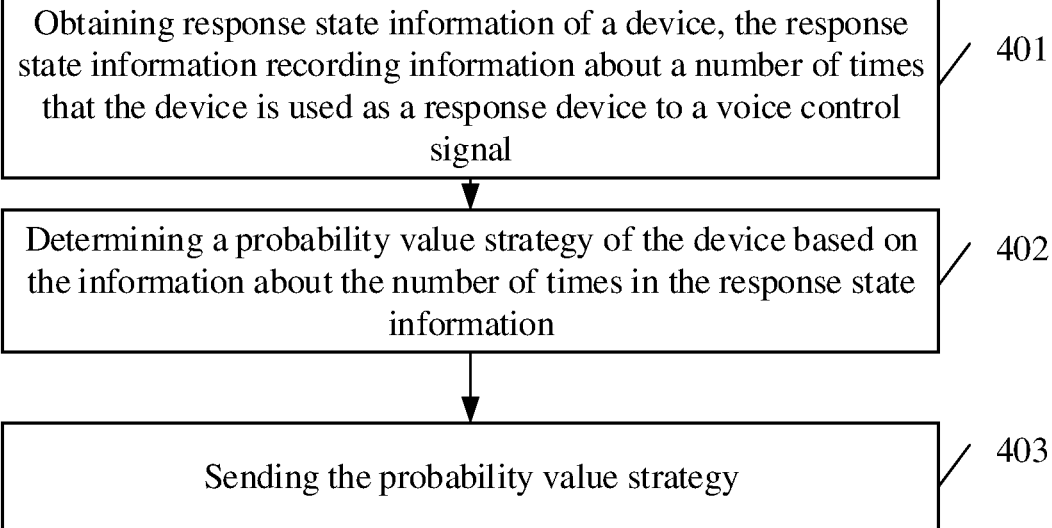

Obtaining response state information of a device, the response state information recording information about a number of times that the device is used as a response device to a voice control signal    401

Determining a probability value strategy of the device based on the information about the number of times in the response state information    402

Sending the probability value strategy    403

FIG. 4

METHOD FOR DETERMINING RESPONSE DEVICE, DEVICE, AND SERVER

CROSS-REFERENCE TO RELATED APPLICATIONS

The present application is a continuation application of PCT International Patent Application No. PCT/CN2022/082565, filed on Mar. 23, 2022, which claims priority to and benefits of Chinese Patent Application No. 202111007071.0, filed on Aug. 30, 2021, the entire contents of each of which are incorporated herein by reference for all purposes. No new matter has been introduced

FIELD

The present disclosure relates to the field of electrical device, and more particularly, to a method for determining a response device, a device, and a server.

BACKGROUND

In the smart home system, if a voice wake-up command occurs and several devices with a voice response function are in the same space, a value of signal-to-noise ratio of each device is calculated separately, and a device with the maximum value of the signal-to-noise ratio is selected for wake-up.

In practical applications, the user plans to wake up device A, but the actual wake-up device is device B, resulting in a problem that an actual response is not in accordance with a demand of the user.

SUMMARY

A main object of the present disclosure is to at least provide a method for determining a response device, a device, and a server, aiming at solving a problem that an actual response of the device is not in accordance with a demand in a voice control situation in the related art.

To achieve at least the above object, the present disclosure provides a method for determining a response device. The method includes: obtaining a target probability value of a device as a response device based on a preset probability value strategy subsequent to receiving a voice control signal, the probability value strategy being determined based on response state information of the device to the voice control signal; determining a target signal-to-noise ratio based on the target probability value and a signal-to-noise ratio of the received voice control signal; and determining whether the device is a response device to the voice control signal based on the target signal-to-noise ratio.

According to an embodiment of the present disclosure, the probability value strategy includes a determination mode of a probability value corresponding to each time interval. The obtaining the target probability value of the device as the response device includes: obtaining reception time of the voice control signal; and determining the target probability value based on a determination mode corresponding to a time interval in which the reception time is located.

According to an embodiment of the present disclosure, the method further includes: calculating a similarity between a keyword in the voice control signal and a preset standard word to obtain confidence information; and disallowing the determining whether the device is a response device to the voice control signal when the confidence information is smaller than a preset confidence threshold, the confidence threshold being determined based on the target probability value.

According to an embodiment of the present disclosure, the method further includes: recording a number of times that the device is used as a response device to obtain response state information; sending the response state information; and receiving update information of a probability value strategy corresponding to the response state information.

A computer-readable storage medium has a computer program stored thereon. The computer program, when executed by at least one processor, implements the method described in any one of the above methods.

A device includes a memory and at least one processor. The memory stores a computer program. The processor, when executing the computer program, implements the method described in any one of the above methods.

A method for determining a response device, includes: obtaining response state information of a device to a voice control signal, the response state information including a number of times that the device is used as a response device; determining a probability value strategy of the device based on the number of times in the response state information; and sending the probability value strategy.

According to an embodiment of the present disclosure, the probability value strategy includes a determination mode corresponding to each time interval, when the response state information includes a number of times that the device is used as a response device in each time interval.

According to an embodiment of the present disclosure, when the response state information further includes validity information about the device being used as a response device each time, a determination mode in each time interval is determined based on a valid number of times $T_i$ and/or an invalid number of times $F_i$ in each time interval, i being a positive integer indicating a sequence number for the time interval.

According to an embodiment of the present disclosure, a probability value for an i-th time interval is determined by one or more modes as follows: when the validity information is valid, obtaining a maximum valid number of times and/or a minimum valid number of times from the valid numbers of times in all time intervals, and performing a calculation on the valid number of times $T_i$ and at least one of the maximum valid number of times and the minimum valid number of times to obtain a first value as a probability value for the i-th time interval; when the validity information is invalid, obtaining a maximum invalid number of times and/or a minimum invalid number of times from the invalid numbers of times in all time intervals, performing a calculation on the invalid number of times $F_i$ and at least one of the maximum invalid number of times and the minimum invalid number of times to obtain a second value, and obtaining a third value as a probability value for the i-th time interval based on a difference between a preset standard value and the second value; and when one part of the validity information is valid and the other part of the validity information is invalid, determining the first value corresponding to the valid number of times for the device and the second value corresponding to the invalid number of times for the device, respectively, and obtaining a fourth value as a probability value for the i-th time interval based on a difference between the first value and the second value.

A computer-readable storage medium has a computer program stored thereon. The computer program, when executed by at least one processor, implements the method described in any one of the above methods.

A server includes a memory and at least one processor. The memory stores a computer program. The processor, when executing the computer program, implements the method described in any one of the above methods.

In technical solutions of the present disclosure, the response device is determined under the precondition of conforming to the operation habits of the user, allowing a determination operation to be more in line with the demand of the user, and improving a matching degree between the determined result and the expectation of the user.

BRIEF DESCRIPTION OF DRAWINGS

In order to clearly illustrate technical solutions of embodiments of the present disclosure, a brief description of drawings used in the embodiments or the related art is given below. Obviously, the drawings in the following descriptions are only part embodiments of the present disclosure, and for those skilled in the art, other drawings can be obtained according to structures illustrated in these drawings without inventive labor.

FIG. 1 is a flowchart of a method for determining a response device provided in a first embodiment of the present disclosure.

FIG. 2 is a flowchart of a method for determining a response device provided in a second embodiment of the present disclosure.

FIG. 4 is a flowchart of a method for determining a response device provided in a fourth embodiment of the present disclosure.

Figure 3:
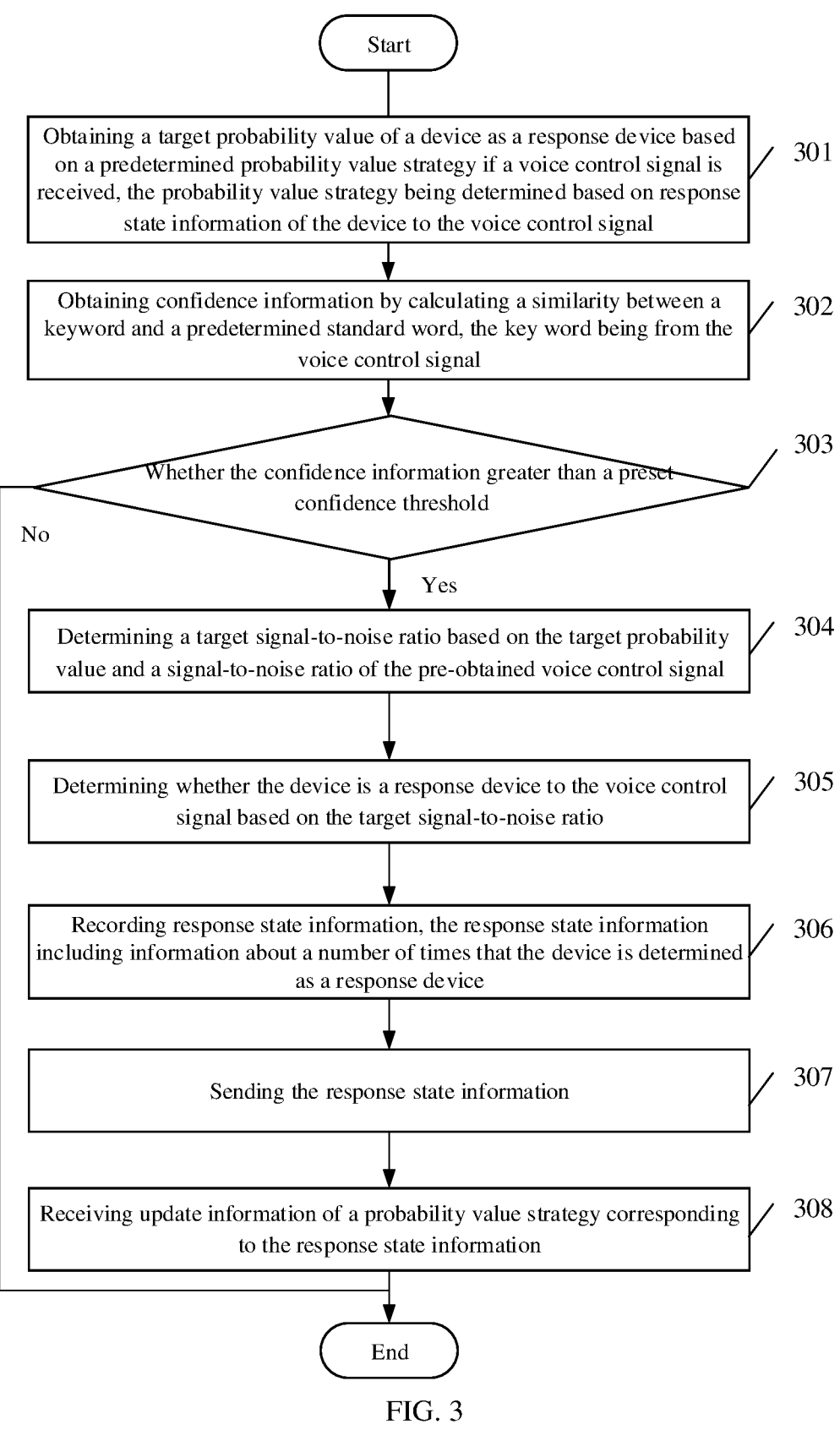
FIG. 3 is a flowchart of a method for determining a response device provided in a third embodiment of the present disclosure.

The implementation of the objects, functional features, and advantages of the present disclosure will be further described in conjunction with embodiments and with reference to the accompanying drawings.

DESCRIPTION OF EMBODIMENTS

Technical solutions of embodiments of the present disclosure will be clearly and completely described below in conjunction with accompanying drawings in the present disclosure. Obviously, the embodiments described below are only part of the embodiments of the present disclosure and are not all embodiments of the present disclosure. Based on the embodiments of the present disclosure, other embodiments obtained by those skilled in the art without inventive labor are within the protection scope of the present disclosure.

It should be noted that all directional indications (such as, up, down, left, right, front, rear, etc.) in the embodiments of the present disclosure are only used to explain the relative position relationship, motion situation, and the like between components in a certain specific posture (as shown in the drawings). If the specific posture changes, the directional indication changes accordingly.

In addition, terms "first" and "second" are only used for descriptive purposes, and cannot be understood as indicating or implying relative importance or implicitly indicating the number of the indicated technical features. Therefore, the features associated with "first" and "second" may explicitly or implicitly include at least one of the features. In the description of the present disclosure, "plurality" means at least two, unless otherwise specifically defined.

In the present disclosure, unless otherwise clearly specified and limited, terms such as "connect", "fix" and the like should be understood in a broad sense. For example, it may be a fixed connection or a detachable connection or a connection as one piece; mechanical connection or electrical connection; direct connection or indirect connection through an intermediate; internal communication of two components or the interaction relationship between two components, unless otherwise clearly limited. For those skilled in the art, the specific meaning of the above-mentioned terms in the present disclosure can be understood according to specific circumstances.

In addition, the technical solutions of various embodiments of the present disclosure can be combined with each other, but it must be based on what can be achieved by those skilled in the art. When the combination of the technical solutions is mutually contradictory or cannot be achieved, it should be considered that such a combination of technical solutions does not exist and is not within the protection scope required by the present disclosure.

First Embodiment

FIG. 1 shows a flowchart of a method for determining a response device provided in the first embodiment of the present disclosure. As shown in FIG. 1, the method includes operations at blocks.

At block 101, a target probability value of a device as a response device is obtained based on a preset probability value strategy if a voice control signal is received. The probability value strategy is determined based on response state information of the device to the voice control signal.

In an exemplary embodiment, the device has a voice response function and can be a household appliance device, such as an air conditioner, a television, a refrigerator, and a smart speaker.

In an exemplary embodiment, a voice control command can be a wake-up instruction, a parameter setting instruction, or a switch on-off instruction.

In an exemplary embodiment, the probability value strategy can be actively delivered to the device by a cloud platform. Alternatively, a request is made by the device to the cloud platform, and the cloud platform sends the probability value strategy to the device based on the request.

In an exemplary embodiment, the probability value in the probability value strategy satisfies the following law.

The more the number of times that the device is determined as a response device, the higher the likelihood that the device will continue to be a response device in the current environment and the higher the probability value corresponding to the device. Conversely, the less the number of times that the device is determined as a response device, the lower the likelihood that the device will continue to be a response device in the current environment and the lower the probability value corresponding to the device.

Since the probability value strategy is generated based on the response state information, the usage habits of the user who determines the device as a response device in historical usage can be accurately reflected. Compared with the probability value in the related art that applies only to the current environment, and compared with the probability value that a device is determined as a response device based on the current environment, the present disclosure can better assist in determining a response device by combining the user operation habits embodied in the probability value in historical operations.

At block 102, a target signal-to-noise ratio is determined based on the target probability value and a signal-to-noise ratio of the pre-obtained voice control signal.

The signal-to-noise ratio is a ratio of an energy value of the received voice control signal to an energy value of a noise signal. Calculation methods of the signal-to-noise ratio in the related art are applicable to this operation, which are not described herein.

In an exemplary embodiment, the target probability value and the signal-to-noise ratio can be multiplied to obtain a result of the multiplication operation as the target signal-to-noise ratio.

The signal-to-noise ratio in the current environment is modified through the target probability value, which allows the obtained signal-to-noise ratio to not only reflect a size of the signal-to-noise ratio but also reflect the user operation habits.

At block 103, whether the device is a response device to the voice control signal is determined based on the target signal-to-noise ratio.

Compared with directly using the signal-to-noise ratio under the current environment in the related art, the solution provided in the embodiment of the present disclosure is to determine by using the target signal-to-noise ratio obtained by the target probability value and the current signal-to-noise ratio. Since the target signal-to-noise ratio can not only reflect the size of the signal-to-noise ratio, but also reflect the user operation habits, the response device is determined based on the target signal-to-noise ratio and thus the response device is determined on the premise of conforming to the user operation habits. Therefore, the determination operation can be more in line with the demand of the user, and the matching degree between the determined result and the expectation of the user is improved.

According to the method provided in the first embodiment of the present disclosure, if a voice control signal is received, a target probability value of a device determined as a response device is obtained based on a preset probability value strategy. A target signal-to-noise ratio is determined based on the target probability value and a signal-to-noise ratio of the received voice control signal. Whether the device is a response device to the voice control signal is determined based on the target signal-to-noise ratio. The response device is determined on the premise of conforming to the user operation habits, which allows the determination operation to better meet the demand of the user, and the matching degree between the determination result and the expectation of the user to be improved.

Second Embodiment

FIG. 2 shows a flowchart of a method for determining a response device provided in the second embodiment of the present disclosure. As shown in FIG. 2, the method includes operations at blocks.

At block 201, a target probability value of a device as a response device is obtained based on a preset probability value strategy if a voice control signal is received. The probability value strategy is determined based on response state information of the device to the voice control signal.

In an exemplary embodiment, the device has a voice response function, and can be a household appliance device, such as an air conditioner, a television, a refrigerator, and a smart speaker.

In an exemplary embodiment, a voice control command can be a wake-up instruction, a parameter setting instruction, or a switch on-off instruction.

In an exemplary embodiment, the probability value strategy can be actively delivered to the device by a cloud platform. Alternatively, a request is made by the device to the cloud platform, and the cloud platform sends the probability value strategy to the device based on the request.

In an exemplary embodiment, the probability value in the probability value strategy satisfies the following law.

The more the number of times that the device is determined as a response device, the higher the likelihood that the device will continue to be a response device in the current environment and the higher the probability value corresponding to the device. Conversely, the less the number of times that the device is determined as a response device, the lower the likelihood that the device will continue to be a response device in the current environment and the lower the probability value corresponding to the device.

Since the probability value strategy is generated based on the response state information, the usage habits of the user who determines the device as a response device in historical usage can be accurately reflected. Compared with the probability value in the related art that applies only to the current environment, and compared with the probability value that a device is determined as a response device based on the current environment, the present disclosure can better assist in determining a response device by combining the user operation habits embodied in the probability value in historical operations.

In an exemplary embodiment, the probability value strategy can be a determination mode of a probability value corresponding to each time interval for the device.

When the target probability value of the device that is determined as a response device is determined, time that the device receives the voice control signal can be obtained. The target probability value can be obtained based on a determination mode adopted by a target time interval corresponding to this time.

A time length of the time interval can be set based on needs. Taking one hour as an example for explanation, if reception time is 11:30, the target time interval is from 11:00 to 12:00, and the target probability value is obtained based on the determination mode corresponding to the target time interval.

By setting the probability value strategy of the device to include determination modes of different time intervals, probability information of the same device as a response device in different time intervals can be reflected. Therefore, operation habits of the user on the device at different times can be more accurately reflected, allowing the size of the target probability value to be more accurate, and support provided for determining the response device to be more accurate.

At block 202, confidence information is obtained by calculating a similarity between a keyword and a preset standard word. The keyword is from the voice control signal.

Taking the voice control signal as the wake-up instruction as an example, a similarity between a keyword in the voice control signal and a standard word corresponding to the wake-up instruction is calculated, and confidence information can be obtained.

At block 203, whether the confidence information is greater than a preset confidence threshold is determined.

The confidence threshold is determined based on the target probability value. The larger the target probability value, the higher the likelihood that the device is determined as a response device, and the lower the value of the confidence. Conversely, the smaller the target probability value, the lower the likelihood that the device is determined as a response device, and the higher the value of the confidence.

Taking the voice control signal as the wake-up instruction as an example, if the target probability value is larger, the likelihood of waking up the device is higher. In order to facilitate waking up the device smoothly under different environments, the value of the confidence is set to be lower to improve a success rate of waking up the device. Conversely, if the target probability value is smaller, the likelihood of waking up the device is lower. In order to reduce the false waking up of the device by the ambient sound, the value of the confidence is set to be higher to properly control the success rate of waking up the device.

As can be seen from the above example, setting the confidence threshold based on the target probability value can provide support for determining the device that is determined as a response device.

If the confidence information is greater than the confidence threshold, operations at block 204 is implemented. Otherwise, the process ends.

At block 204, a target signal-to-noise ratio is determined based on the target probability value and a signal-to-noise ratio of the pre-obtained voice control signal.

The signal-to-noise ratio is a ratio of an energy value of the received voice control signal to an energy value of a noise signal. Calculation methods of the signal-to-noise ratio in the related art are applicable to this operation, which are not described herein.

In an exemplary embodiment, the target probability value and the signal-to-noise ratio can be multiplied to obtain a result of the multiplication operation as the target signal-to-noise ratio.

The signal-to-noise ratio in the current environment is modified by the target probability value, which allows the obtained signal-to-noise ratio can not only reflect the size of the signal-to-noise ratio but also reflect the user operation habits.

At block 205, whether the device is a response device to the voice control signal is determined based on the target signal-to-noise ratio.

Compared with directly using the signal-to-noise ratio under the current environment in the related art, the solution provided in the embodiment of the present disclosure is to determine by using the target signal-to-noise ratio obtained by the target probability value and the current signal-to-noise ratio. Since the target signal-to-noise ratio can not only reflect the size of the signal-to-noise ratio, but also reflect the user operation habits, the response device is determined based on the target signal-to-noise ratio and thus the response device is determined on the premise of conforming to the user operation habits. Therefore, the determination operation can be more in line with the demand of the user, and the matching degree between the determined result and the expectation of the user is improved.

According to the method provided in the second embodiment of the present disclosure, if a voice control signal is received, a target probability value of a device determined as a response device is obtained based on a preset probability value strategy. A target signal-to-noise ratio is determined based on the target probability value and a signal-to-noise ratio of the received voice control signal. Whether the device is a response device to the voice control signal is determined based on the target signal-to-noise ratio. The response device is determined on the premise of conforming to the user operation habits, which allows the determination operation to better meet the demand of the user, and the matching degree between the determination result and the expectation of the user to be improved. By setting the probability value strategy of the device to include determination modes of different time intervals, the user operation habits for the device at different times can be more accurately reflected, allowing the size of the target probability value to be more accurate and support provided for determining the response device to be more accurate. The confidence threshold is set based on the target probability value, which can provide support for determining the device that is determined as a response device.

Third Embodiment

FIG. 3 shows a flowchart of a method for determining a response device provided in the third embodiment of the present disclosure. As shown in FIG. 3, the method includes operations at blocks.

At block 301, a target probability value of a device as a response device is obtained based on a preset probability value strategy if a voice control signal is received. The probability value strategy is determined based on response state information of the device to the voice control signal.

In an exemplary embodiment, the device has a voice response function and can be a household appliance device, such as an air conditioner, a television, a refrigerator, and a smart speaker.

In an exemplary embodiment, a voice control command can be a wake-up instruction, a parameter setting instruction, or a switch on-off instruction.

In an exemplary embodiment, the probability value strategy can be actively delivered to the device by a cloud platform. Alternatively, a request is made by the device to the cloud platform, and the cloud platform sends the probability value strategy to the device based on the request.

In an exemplary embodiment, the probability value in the probability value strategy satisfies the following law.

The more the number of times that the device is determined as a response device, the higher the likelihood that the device will continue to be a response device in the current environment and the higher the probability value corresponding to the device. Conversely, the less the number of times that the device is determined as a response device, the lower the likelihood that the device will continue to be a response device in the current environment and the lower the probability value corresponding to the device.

Since the probability value strategy is generated based on the response state information, the usage habits of the user who determines the device as a response device in historical usage can be accurately reflected. Compared with the probability value in the related art that applies only to the current environment, and compared with the probability value that a device is determined as a response device based on the current environment, The present disclosure can better assist in determining a response device by combining the user operation habits embodied in the probability value in historical operations.

In an exemplary embodiment, the probability value strategy can be a determination mode of a probability value corresponding to each time interval for the device.

When the target probability value of the device that is determined as a response device is determined, reception time of the voice control signal can be obtained. The target probability value can be obtained based on a determination mode corresponding to a time interval in which the reception time is located.

A time length of the time interval can be set based on needs. Taking one hour as an example for explanation, if reception time is 11:30, the target time interval is from 11:00 to 12:00, and the target probability value is obtained based on the determination mode corresponding to the target time interval.

By setting the probability value strategy of the device to include determination modes of different time intervals, probability information of the same device as a response device in different time intervals can be reflected. Therefore, operation habits of the user on the device at different times can be more accurately reflected, allowing the size of the target probability value to be more accurate, and support provided for determining the response device to be more accurate.

At block 302, confidence information is obtained by calculating a similarity between a keyword and a preset standard word. The keyword is from the voice control signal.

Taking the voice control signal as the wake-up instruction as an example, a similarity between a keyword in the voice control signal and a standard word corresponding to the wake-up instruction is calculated, and confidence information can be obtained.

At block 303, whether the confidence information is greater than a preset confidence threshold is determined.

The confidence threshold is determined based on the target probability value. The larger the target probability value, the higher the likelihood that the device is determined as a response device, and the lower the value of the confidence. Conversely, the smaller the target probability value, the lower the likelihood that the device is determined as a response device, and the higher the value of the confidence.

Taking the voice control signal as the wake-up instruction as an example, if the target probability value is larger, the likelihood of waking up the device is higher. In order to facilitate waking up the device smoothly under different environments, the value of the confidence is set to be lower to improve a success rate of waking up the device. Conversely, if the target probability value is smaller, the likelihood of waking up the device is lower. In order to reduce the false waking up of the device by the ambient sound, the value of the confidence is set to be higher to properly control the success rate of waking up the device.

If the confidence information is greater than the confidence threshold, operations at block 303 is implemented. Otherwise, the process ends.

At block 304, a target signal-to-noise ratio is determined based on the target probability value and a signal-to-noise ratio of the pre-obtained voice control signal.

The signal-to-noise ratio is a ratio of an energy value of the received voice control signal to an energy value of a noise signal. Calculation methods of the signal-to-noise ratio in the related art are applicable to this step, which are not described herein.

In an exemplary embodiment, the target probability value and the signal-to-noise ratio can be multiplied to obtain a result of the multiplication operation as the target signal-to-noise ratio.

The signal-to-noise ratio in the current environment is modified through the target probability value, which allows the obtained signal-to-noise ratio to not only reflect the size of the signal-to-noise ratio, but also reflect the user operation habits.

At block 305, whether the device is a response device to the voice control signal is determined based on the target signal-to-noise ratio.

Compared with directly using the signal-to-noise ratio under the current environment in the related art, the solution provided in the embodiment of the present disclosure is to determine by using the target signal-to-noise ratio obtained by the target probability value and the current signal-to-noise ratio. Since the target signal-to-noise ratio can not only reflect the size of the signal-to-noise ratio, but also reflect the user operation habits, the response device is determined based on the target signal-to-noise ratio and thus the response device is determined on the premise of conforming to the user operation habits. Therefore, the determination operation can be more in line with the demand of the user, and the matching degree between the determined result and the expectation of the user is improved.

At block 306, response state information is recorded. The response state information includes information about a number of times that the device is used as a response device.

At block 307, the response state information is sent.

A triggering condition for the above sending operation can be that a time length of recording from the beginning reaches a preset time length threshold. Alternatively, the sending operation can be performed after receiving a request sent by the cloud platform.

At block 308, update information of a probability value strategy corresponding to the response state information is received.

By receiving the update information of the probability value strategy, the probability value strategy can be updated in time. Therefore, the probability value strategy can better match operation habits of the user, and the matching degree between the determination result and the expectation of the user can be further improved.

According to the method provided by the embodiments of the present disclosure, a target probability value of a device as a response device is obtained based on a preset probability value strategy if a voice control signal is received. The target signal-to-noise ratio is determined based on the target probability value and a signal-to-noise ratio of the received voice control signal. Whether the device is a response device to the voice control signal is determined based on the target signal-to-noise ratio. The response device is determined on the premise of conforming to the user operation habits, which allows the determination operation to meet the demand of the user more, and the matching degree between the determination result and the expectation of the user to be improved. By setting the probability value strategy of the device to include determination modes of different time intervals, the user operation habits for the device at different times can be more accurately reflected, allowing the size of the target probability value to be more accurate and support provided for determining the response device to be more accurate. The confidence threshold is set based on the target probability value, which can provide support for determining the device that is determined as a response device. By updating the probability value strategy, the operation habits of the user can be better matched, and the matching degree between the determination result and the expectation of the user can be further improved.

Fourth Embodiment

FIG. 4 shows a flowchart of a method for determining a response device provided in the fourth embodiment of the present disclosure. As shown in FIG. 4, the method includes operations at blocks.

At block 401, response state information of a device is obtained. The response state information records a number of times that the device is used as a response device to a voice control signal.

A triggering condition of the above obtaining operation can be that a time length of recording from the beginning reaches a preset time length threshold and then the device actively sends it. Alternatively, the obtaining operation is received by the device after a request is sent to the cloud platform.

At block 402, a probability value strategy of the device is determined based on the number of times in the response state information.

The more the number of times that the device is determined as a response device, the higher the likelihood that the device will continue to be a response device in the current environment and the higher the probability value corresponding to the device. Conversely, the less the number of times that the device is determined as a response device, the lower the likelihood that the device will continue to be a response device in the current environment and the lower the probability value corresponding to the device.

Since the probability value strategy is generated based on the response state information, the usage habits of the user who determines the device as a response device in historical usage can be accurately reflected. Compared with the probability value in the related art that applies only to the current environment, and compared with the probability value that a device is determined as a response device based on the current environment, the present disclosure can better assist in determining a response device by combining the user operation habits embodied in the probability value in historical operations.

At block 403, the probability value strategy is sent.

By sending the probability value strategy reflecting the operation habits of the user to the device, the device can determine whether to be a response device to a voice control signal based on the probability value strategy.

In the method provided in the fourth embodiment of the present disclosure, response state information in historical data of the device is obtained. The probability value strategy of the device is determined based on information about a number of times in the response state information, and the probability value strategy is sent, to provide data support for allowing the determination operation to meet the user demands.

In the fourth embodiment, the determination mode of probability value strategy can be determined by means of the following application scenario.

First Application Scenario

The response state information includes information about a number of times that the device is determined as a response device information in each time interval.

A determination mode of the probability value of the device determined as a response device in each time interval can be determined by using information about a number of times that the device is determined as a response device in each time interval, thereby obtaining the probability value strategy of the device.

By setting the probability value strategy of the device to include determination modes of different time intervals, probability information of the same device as a response device in different time intervals can be reflected. Therefore, operation habits of the user on the device at different times can be more accurately reflected, allowing the target probability value to be more accurate, and support provided for determining the response device to be more accurate.

Second Application Scenario

The response information includes information about a number of times in each time interval that the device is determined as a response device and validity information about the device being used as a response device each time.

After the device is determined as a response device, if the device is confirmed as a correct response device by the user, the validity information is valid.

If the device is determined to be a false wake-up of a response device caused by ambient sound, and the device is determined as a wrong response device by the user, then the validity information is invalid.

If the device is determined as a response device and the device is the same as an object required to be controlled by the user, the device is a correct response device. If the device is different from an object required to be controlled by the user, the device is a wrong response device.

Based on the above response state information, a valid number of times Ti and/or an invalid number of times Fi for the device determined as a response device can be determined in each time interval, where i is a positive integer indicating a sequence number for the time interval. Then, based on the valid number of times Ti and/or the invalid number of times Fi corresponding to each time interval, a determination mode of the probability value corresponding to each time interval is determined to obtain a calculation strategy of the probability value.

A probability value corresponding to an i-th time interval is determined in the following modes.

1) When the validity information in the i-th time interval is valid, a valid number of times that the device is a response device in each time interval is counted, and a maximum valid number of times Tmax is obtained by selecting the valid number of times with the greatest value; and/or, a minimum valid number of times Tmin is obtained by selecting the valid number of times with the smallest value.

A calculation is performed on the valid number of times Ti and at least one of the maximum valid number of times Tmax and the minimum valid number of times Tmin to obtain a first value as a probability value corresponding to the ith time interval.

In the above mode, since at least one of the minimum valid number of times Tmin and the maximum valid number of times Tmax can be used, the first value can be determined in three manners.

First manner: using only the maximum valid number of times Tmax

A proportional value of the valid number of times Ti and the maximum valid number of times Tmax is calculated and used as the first value.

Second manner: using only the minimum valid number of times Tmin

A difference between the valid number of times Ti and the minimum valid number of times Tmin is calculated to obtain a first calculated value, and then a ratio between the first calculated value and the minimum valid number of times Tmin is calculated.

Third manner: using the maximum valid number of times Tmax and the minimum valid number of times Tmin A difference between the valid number of times Ti and the minimum valid number of times Tmin is calculated to obtain a first calculated value, and a difference between the maximum valid number of times Tmax and the minimum valid number of times Tmin is calculated to obtain a second calculated value.

The first value can be obtained by performing a calculation on the first calculated value and the second calculated value. The first value can be determined by performing a calculation on the first calculated value and the second calculated value.

2) When the validity information in the i-th time interval is invalid, an invalid number of times that the device is a response device in each time interval is counted, and a maximum invalid number of times Fmax is obtained by selecting the invalid number of times with the greatest value; and/or, a minimum invalid number of times Fmin is obtained by selecting the invalid number of times with the smallest value.

A calculation is performed on the invalid number of times Fi and at least one of the maximum invalid number of times Fmax and the minimum invalid number of times Fmin to obtain a second value as a probability value corresponding to the i-th time interval.

In the above mode, since at least one of the minimum invalid number of times Fmin and the maximum invalid number of times Fmax can be used, the second value can be determined in three manners.

First manner: using only the maximum invalid number of times Fmax

A proportional value of the invalid number of times Fi and the maximum invalid number of times Fmax is calculated and used as the first value.

Second manner: using only the minimum invalid number of times Fmin

A difference between the invalid number of times Fi and the minimum invalid number of times Fmin is calculated to obtain a third calculated value, and then a ratio between the first calculated value and the minimum invalid number of times Fmin is calculated.

Third manner: using the maximum invalid number of times Fmax and the minimum invalid number of times Fmin A difference between the invalid number of times Fi and the minimum invalid number of times Fmin is calculated to obtain a third calculated value, and a difference between the maximum invalid number of times Fmax and the minimum invalid number of times Fmin is calculated to obtain a fourth calculated value.

The second value can be obtained by performing a calculation on the third calculated value and the fourth calculated value. The second value can be determined by performing a calculation on the third calculated value and the fourth calculated value.

3) In the i-th time interval, one part of the validity information is valid and the other part of the validity information is invalid.

A first value corresponding to validity information being valid and a second value corresponding to validity information being invalid are obtained by adopting the above modes.

A fourth value as a probability value in the i-th time interval for the device is calculated through a difference between the first value and the second value.

The probability value determined in the above mode is more accurate, allowing the device to be more in line with the operation habits of the user.

Fifth Embodiment

Figure 5:
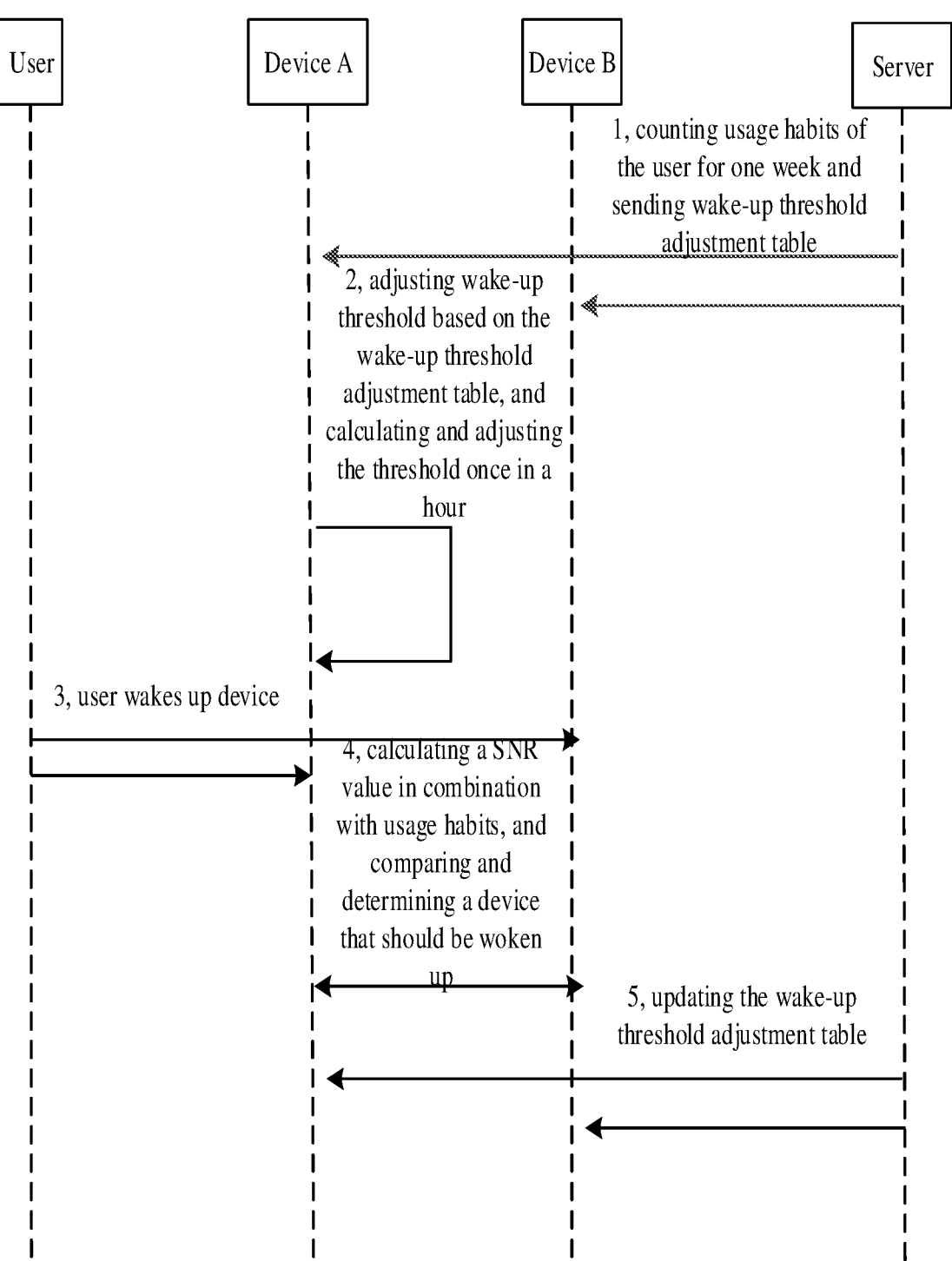
FIG. 5 is a flowchart of a method for determining a response device provided in a fifth embodiment of the present disclosure.

FIG. 5 is a flowchart of a method for determining a response device provided in the fifth embodiment of the present disclosure. As shown in FIG. 5, the method shown in FIG. 5 is described by taking a voice control signal as a wake-up instruction as an example, and the method includes operations at blocks.

At block 501, after connection time of the device to a server reaches one week, the server generates a wake-up threshold adjustment table (corresponding to the probability value strategy described above) based on a usage record of the device in the one week and sends the wake-up threshold adjustment table to the device.

The wake-up threshold adjustment table is obtained in the following mode.

Taking the time interval of one hour as an example, a valid number of wake-up times (T) and an invalid number of wake-up times (F) of the device in each hour are counted by the hour. A maximum valid number of wake-up times (Tmax), a maximum invalid number of wake-up times (Fmax), a minimum valid number of wake-up times (Tmin), and a minimum invalid number of wake-up times (Fmin) are obtained from all time intervals.

The valid wake-up means that valid intention is recognized within one minute before and after wake-up of the device. The invalid wake-up includes false wake-up caused by ambient sound and false determination that the current device is waken up when the user wants to wake up another device. The determination condition is that no valid intention occurs within one minute before and after the wake-up of the device.

Single-hour wake-up threshold adjustment percentage is P, where $P=(T-Tmin)/(Tmax-Tmin)-(F-Fmin)/(Fmax-Fmin)$ (0%<P<100%). The content of the adjustment table is P value for each hour.

A threshold adjustable range is a threshold range corresponding to a wake-up rate of 80% to 95%.

At block 502, subsequent to receiving the wake-up threshold adjustment table, the device sets a wake-up threshold based on a preset threshold adjustable range in combination with a percentage in the adjustment table and calculates a threshold every hour.

Wake-up confidence indicates a similarity between an input audio and a wake-up word and a wake-up model outputs the wake-up confidence after processing the input audio.

A wake-up threshold is a fixed value obtained through test and verification. The wake-up confidence is higher than the wake-up threshold, and it is determined that the wake-up word is hit.

At block 503, an SNR (signal-to-noise ratio) value is calculated when the user wakes up the device. An SNR value conforming to the usage habits of the user is obtained by multiplying the SNR and the current percentage in the wake-up threshold adjustment table.

At block 504, when a plurality of devices is waiting to be waken up at the same time, the calculated values from block 503 are compared to select the device with a maximum value for waking up.

At block 505, the wake-up threshold adjustment table is regularly updated by the server.

In the method provided in the fifth embodiment of the present disclosure, a success rate of the user waking up the target device can be improved by counting the usage habits of the user every hour and adjusting the wake-up threshold and the SNR value after wake-up of the device. The wake-up threshold can be lowered when the user uses the device less, allowing a likelihood of false wake-up by ambient sound to be reduced.

The embodiments of the present disclosure provide a storage medium storing a computer program. The computer program, when executed by at least one processor, can implement the method in any one of FIG. 1 to FIG. 3.

The embodiments of the present disclosure provide a storage medium storing a computer program. The computer program, when executed by at least one processor, can implement the method in FIG. 4.

The embodiments of the present disclosure provide a device including a memory and at least one processor. The memory stores a computer program, and the processor, when executing the computer program in the memory, can implement the method in any one of FIG. 1 to FIG. 3.

The processor in the above device can be provided in the device as a separate module or integrated in the processor of the device, and is configured to determine whether the device is a responsive device in response to receiving the voice control signal.

The embodiments of the present disclosure provide a server including a memory and at least one processor. The memory stores a computer program, and the processor, when executing the computer program in the memory, can implement the method in FIG. 4.

The processor in the server may be provided in the device as a separate module, or integrated in the processor of the server, and is configured to generate a probability value strategy for the device, such that the device may perform the determination of the response device based on the probability value strategy.

While some embodiments of the present disclosure have been described above, the present disclosure is not limited to these embodiments. Any equivalent structural transformation or direct/indirect applications to other related technical fields made by utilizing the contents of the specification and the accompanying drawings under the concept of the present disclosure is included in the protection scope of the present disclosure.

What is claimed is:

1. A method for determining a response device, comprising:

obtaining a target probability value of a device as a response device based on a preset probability value strategy subsequent to receiving a voice control signal, the probability value strategy being determined based on response state information of the device to the voice control signal;

determining a target signal-to-noise ratio based on the target probability value and a signal-to-noise ratio of the received voice control signal; and determining whether the device is a response device to the voice control signal based on the target signal-to-noise ratio.

2. The method according to claim 1, wherein:

the probability value strategy comprises a determination mode of a probability value corresponding to each time interval; and said obtaining the target probability value of the device as the response device comprises:

obtaining reception time of the voice control signal; and determining the target probability value based on a determination mode corresponding to a time interval in which the reception time is located.

3. The method according to claim 1, further comprising:

calculating a similarity between a keyword in the voice control signal and a preset standard word to obtain confidence information; and disallowing said determining whether the device is a response device to the voice control signal when the confidence information is smaller than a preset confidence threshold, the confidence threshold being determined based on the target probability value.

4. The method according to claim 1, further comprising:

recording a number of times that the device is used as a response device to obtain response state information;

sending the response state information; and receiving update information of a probability value strategy corresponding to the response state information.

5. A non-transitory computer-readable storage medium, having a computer program stored thereon, wherein the computer program is executable by one or more processors to implement the method according to claim 1.

6. A device comprising:

a memory storing a computer program; and one or more processors, wherein the one or more processors are configured to, when executing the computer program, implement the method according to claim 1.

7. A method for determining a response device, comprising:

obtaining response state information of a device to a voice control signal, the response state information comprising a number of times that the device is used as a response device;

determining a probability value strategy of the device based on the number of times in the response state information;

sending the probability value strategy to the device; and determining, based on the probability value strategy, whether the device is the response device to the voice control signal.

8. The method according to claim 7, wherein the probability value strategy comprises a determination mode corresponding to each time interval, when the response state information comprises a number of times that the device is used as a response device in each time interval.

9. The method according to claim 8, wherein when the response state information further comprises validity information about the device being used as a response device each time, a determination mode in each time interval is determined based on a valid number of times $T_i$ and/or an invalid number of times $F_i$ in each time interval, i being a positive integer indicating a sequence number for the time interval.

10. The method according to claim 9, wherein a probability value for an i-th time interval is determined by: when the validity information is invalid, obtaining a maximum invalid number of times and/or a minimum invalid number of times from the invalid numbers of times in all time intervals, performing a calculation on the invalid number of times $F_i$ and at least one of the maximum invalid number of times and the minimum invalid number of times to obtain a second value, and obtaining a third value as a probability value for the i-th time interval based on a difference between a preset standard value and the second value.

11. The method according to claim 9, wherein a probability value for an i-th time interval is determined by: when the validity information is valid, obtaining a maximum valid number of times and/or a minimum valid number of times from the valid numbers of times in all time intervals, and performing a calculation on the valid number of times $T_i$ and at least one of the maximum valid number of times and the minimum valid number of times to obtain a first value as a probability value for the i-th time interval.

12. The method according to claim 11, wherein a probability value for an i-th time interval is determined by: when the validity information is invalid, obtaining a maximum invalid number of times and/or a minimum invalid number of times from the invalid numbers of times in all time intervals, performing a calculation on the invalid number of times Fi and at least one of the maximum invalid number of times and the minimum invalid number of times to obtain a second value, and obtaining a third value as a probability value for the i-th time interval based on a difference between a preset standard value and the second value.

13. The method according to claim 12, wherein a probability value for an i-th time interval is determined by: when one part of the validity information is valid and the other part of the validity information is invalid, determining the first value corresponding to the valid number of times for the device and the second value corresponding to the invalid number of times for the device, respectively, and obtaining a fourth value as a probability value for the i-th time interval based on a difference between the first value and the second value.

14. The method according to claim 12, wherein a probability value for an i-th time interval is determined by: when one part of the validity information is valid and the other part of the validity information is invalid, determining the first value corresponding to the valid number of times for the device and the second value corresponding to the invalid number of times for the device, respectively, and obtaining a fourth value as a probability value for the i-th time interval based on a difference between the first value and the second value.

15. A non-transitory computer-readable storage medium, having a computer program stored thereon, wherein the computer program is executable by one or more processors to implement the method according to claim 7.

16. A server comprising:

a memory storing a computer program; and one or more processors, wherein the one or more processors are configured to, when executing the computer program, implement the method according to claim 7.

\* \* \* \* \*